United States Patent

Povolotsky et al.

[15] 3,703,025

[45] Nov. 21, 1972

[54] METHOD OF MAKING A COMPOSITE STEEL-ALUMINUM ANODE ROD FOR ELECTROLYSIS OF ALUMINUM

[72] Inventors: Aron Markovich Povolotsky; Vyacheslav Petrovich Sushkin; Anatoly Semenovich Fateichev; Nikolai Vasilievich Gavrilov, all of Leningrad, U.S.S.R.

[73] Assignee: Leningradskoe Proektno-Experimetalnoe Otdelenie Vsesojuz-Nogo Gosudarstvennogo Nauchno Issledovatelskogo I Proekt-Nogo Instituta Vniiproektelektromontash, Leningrad, U.S.S.R.

[22] Filed: April 6, 1971

[21] Appl. No.: 131,670

[52] U.S. Cl. ..................29/446, 29/471.1, 29/475, 29/504, 287/189.36 B
[51] Int. Cl. ...............................................B23p 11/02
[58] Field of Search.....287/189.36 B; 29/446, 471.1, 29/472.1, 475, 504

[56] References Cited

UNITED STATES PATENTS 3,070,845    1/1963    Cheskin....................29/446 X
3,358,348   12/1967    McGlinchy..............29/446 X
3,489,446    1/1970    Williams................29/471.1 X Primary Examiner—John F. Campbell
Assistant Examiner—Richard Bernard Lazarus
Attorney—Waters, Roditi, Schwartz & Nissen

[57] ABSTRACT

The disclosure relates to a composite steel-aluminum anode rod comprising an aluminum bar having a tail portion extending aside therefrom and a steel rod consisting of two portions. One portion of the steel rod has a socket, in which there is rigidly fixed the tail portion of the aluminum bar in the process of welding both portuons of the steel rod. The second portion of the steel rod is butt-welded to the tail portion of the aluminum bar.

A method of making a composite steel-aluminum anode rod, providing for butt welding of one of the portions of the steel rod to the tail portion of the aluminum bar, after which operation the tail portion of the aluminum bar is put into the socket in the second portion of the steel rod. Then the steel rod is squeezed and both portions thereof are welded in a prestressed state for rigidly fixing the prestressed state of the weld joint between the steel rod and the aluminum bar.

1 Claim, 2 Drawing Figures

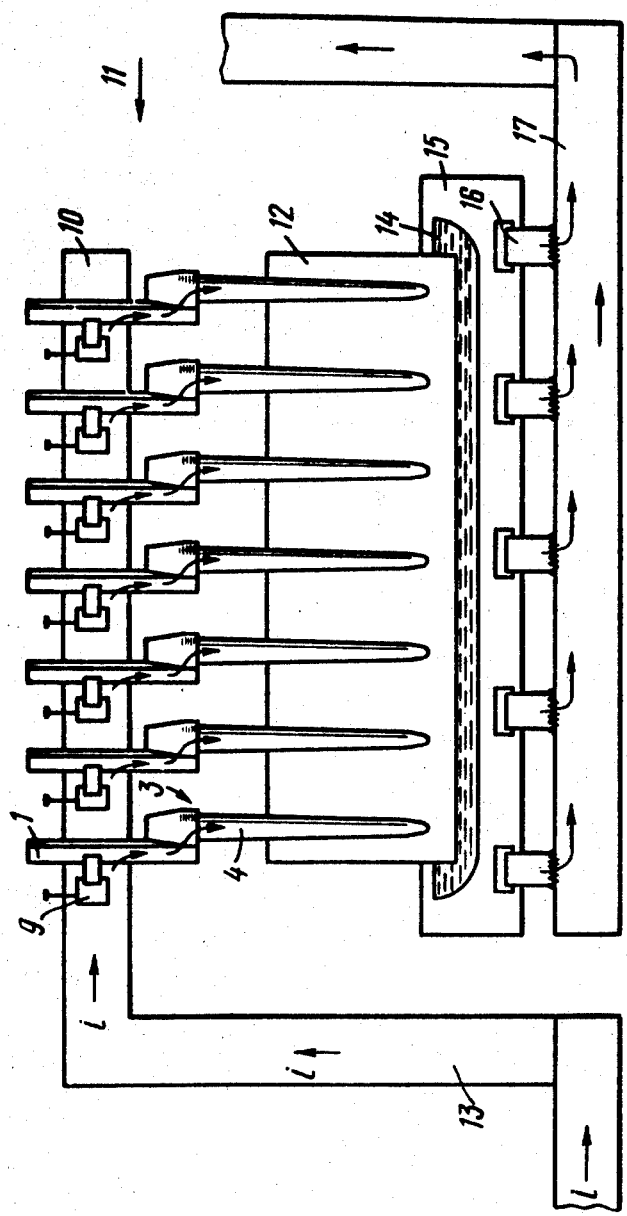

METHOD OF MAKING A COMPOSITE STEEL-ALUMINUM ANODE ROD FOR ELECTROLYSIS OF ALUMINUM

The invention relates to a construction of steel-aluminium rods employed in apparatus for electrolysis of aluminium as conductors for supplying electric current to the anode electrodes of these apparatus and used for keeping them suspended from the current-carrying bar, and to methods of making such rods.

Known in the art are composite steel-aluminium anode rods comprising an aluminium bar having a tail portion extending aside and a steel rod overlappingly welded to the tail portion of the bar. The tail portion of the bar is also secured to the steel rod by means of bolts.

Also known in the art is a method of making the above composite rods. Prior to the welding the steel rod is heated, cleaned with rough sandpaper and etched. After the etching the surface of the rod is covered with a braze layer on which an aluminum layer is built-up.

After that the tail portion of the aluminium bar is overlappingly welded to the steel rod treated by the above-described method, the tail portion being additionally bolted to the steel rod.

In the process of operation of the electrolyzer, the anode suspended from the steel-aluminium rods burns out exposing the ends of the steel rods. Therefore, the lower rods are periodically turned-off and set at a higher level. This operation is often associated with destruction of the weld joint because the bolt joint does not remove the mechanical load from the weld joint so that during the mounting and dismantling of the rods the entire mechanical load is taken up by the steel-aluminium weld joint having a low mechanical strength.

In the process of making the above rods by the known method, manual welding and brazing operations are used, associated with application of expensive materials. Furthermore, the known method comprises a large number of operations.

Therefore, the production cost of the rods is very high.

An object of the present invention is to provide a method of making steel-aluminium rod units having a higher mechanical strength, higher operational reliability and less expensive than the known composite rods.

Another object of the invention is to increase the efficiency of the process of manufacture of such rods.

We propose a steel-aluminium rod unit for apparatus for electrolysis of aluminium comprising an aluminium bar with an extended aside tail portion and a steel rod welded to this tail portion of the bar. According to the invention, the steel rod consists of two portions by length, one portion having a socket for rigid mounting of the tail portion of the aluminium bar during the welding of both portions and the other portion being butt-welded to the tail portion of the aluminium bar.

We also propose a method of making a steel-aluminium anode rod unit by welding a steel rod with an aluminium bar. According to the invention, the steel rod is butt-welded to the tail portion of the aluminium bar thereafter, the tail portion of the bar is put into the socket of one of the portions of the steel rod which is them squeezed for prestressing the weld joint. After that, both portions of the prestressed portions of the steel rod are welded for fixing the stressed state of the weld joint between the steel rod and the aluminium bar.

The operation of the proposed rod units even in high-power electrolyzers has shown that the weld joint connecting the steel rod and aluminium bar does not break down due to the fact that the mechanical load during the mounting and dismantling of the rod unit is not applied on the weld joint alone but is taken by the whole aluminium bar and this makes it possible to keep the steel-aluminium weld joint in a prestressed state due to the insertion of the tail portion of the aluminium bar into the socket of one of the portions of the steel rod and due to the welding of both portions of the steel rod under squeezed condition.

In the proposed method all the operations of the process are mechanized, while the amount of these operation is reduced due to elimination of operation of heating, cleaning, and bracing of the steel rod and building-up a layer of aluminium thereon.

This increases the efficiency of manufacture of the rod units and reduces ther cost.

Other objects and advantages of the invention will be apparent from a consideration of the following detailed description of the construction of the steel-aluminium rod unit and a method of making the same, reference being made to the accompanying drawings, in which:

FIG. 2 shows a diagram of an electrolyzer of aluminium provided with the proposed steel-aluminium rod units.

Figure 1:
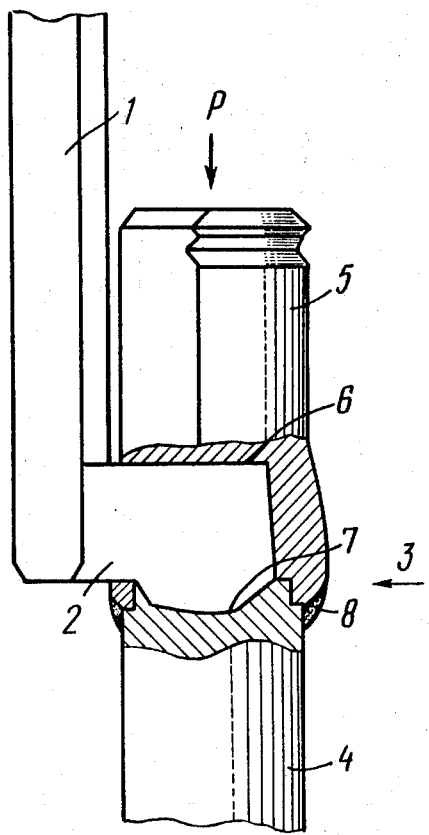
FIG. 1 shows the proposed steel-aluminium rod unit viewed partly in section in the place of connection.

The steel-aluminium anode rod unit for electrolyzers for producing aluminium consists of an aluminium bar 1 (FIG. 1) having a tail portion 2 extending aside and a steel rod 3 consisting of two portions 4 and 5 by length. The portion 5 of the steel rod 3 comprises a socket 6 for accommodation of the tail portion 2 of the aluminium bar 1. The tail portion 2 of the bar 1 and the portion 4 of the steel rod 3 are welded together through a butt joint 7.

In turn, both portions 4, 5 of the steel rod 3 are welded together by a weld joint 8 to provide for rigid fixation of the tail portion of the aluminium bar 1 in the socket 6 of the steel rod 3.

The above-described steel-aluminium rod unit is made as follows.

The tail portion 2 of the aluminium bar 1 is butt-welded to one of the portions 4 of the steel rod 3.

After that, the second portion 5 of the steel rod 3 is put by the socket 6 on the tail portion 2 of the aluminium bar 1.

Then the steel rod 3 is squeezed in the axial direction to provide a prestressed state in the weld joint 7, thereafter, the squezzed portions 4, 5 of the steel rod 3 are welded together through a weld joint 8 for rigid fixation of the tail portion 2 of the bar 1 in the socket 6 and for keeping the weld joint 7 in a stressed state.

The steel-aluminium rod unit through an eccentric clamp 9 (FIG. 2) is secured by the aluminium bar 1 on the current-carrying aluminium anode bar 10.

The portion 4 of the steel rod 3 of the steel-aluminium rod unit is sintered into the anode 12 of the electrolyzer 11 to hold the anode in a suspended state.

The electric current through the bars 13 is fed to the anode bar 10 and then to the flat surface of the aluminium bar 1 which is in contact with the bar 10.

Through the bar 1 and the steel rod 3 the current is applied to the anode 12. After passing through the electrolyte 14, the current is fed to the cathode 15 and through the steel-aluminium terminals 16 is fed to the cathode bars 17, thereafter, the current is fed to the electrolyzer.

Thus, the steel-aluminium bars in the electrolyzer 11 perform double function: they are used for feeding an electric current to the anode 12 and for holding the latter in a suspended state.

In the process of operation of the electrolyzer 11, the lower portion of the anode 12 burns-out, thereby exposing the ends of the steel rods 3.

Therefore, the lower rod units are periodically replaced to a higher level, for which purpose a special device (not shown) opens an eccentric clamp 9 and turns the rod unit in the anode 12 to facilitate removal of this unit.

In the process unscrewing of the rod units the aluminium bar 1 may strike about the anode bar 10, in which case the bar 1 is subjected to considerable mechanical loads causing deformation of this bar.

The bars may also be subjected to mechanical loads during the transportation of the rod units. Therefore, the joint between the aluminium bar and the steel rod must have high mechanical strength and realibility which are provided by the proposed method of making the rod units.

The use of the proposed method allows a team of three workers to make 50–60 rod units per sift and this 10–15 times as efficient as manufacture of the composite rods by the known method.

We claim:

1. A method of making a composite steel-aluminium anode rod comprising aluminium bar with an extended aside tail portion and a steel rod consisting by length of two portions, one of which is provided with a socket, including the following operations: butt welding of one of the portions of the steel rod with the tail portion of the aluminium bar, putting of the second portion of said steel rod onto the tail portion of said aluminium bar, squeezing of said steel rod in an axial direction for prestressing the weld joint between one of said portions of the steel rod and said tail portion of the aluminium bar welding of both prestressed portions of the steel rod for maintaining the weld joint between said steel rod and said aluminium bar in a stressed state.

* * * * *